July 7, 1931.  F. L. B. FLOOD  1,813,843

FISH BAIT

Filed Sept. 22, 1928

Patented July 7, 1931

1,813,843

UNITED STATES PATENT OFFICE

FRED L. B. FLOOD, OF FROSTPROOF, FLORIDA

FISH BAIT

Application filed September 22, 1928. Serial No. 307,615.

This invention relates to an improvement in fish bait.

The object of the invention is to provide a fish bait which may be properly balanced, so that it may either ride upon the surface of the water or be submerged to the desired extent, and in which novel means is provided for attaching the hook thereto.

A further object of the invention is to provide a fish bait so balanced as to lead from the side. This is accomplished by providing an eye in the side of the bait for an attachment of the line. When the bait is cast from the boat, toward the grassy shore, it travels along the edge according to the length of the line and by reason of the connection of the line with the bait, it keeps away from the boat during retrieving. Also the line is concealed from the view of the fish by reason of its connection with the side of the bait, by reason of the fact that the fish are generally on the opposite side of the bait from the line and cannot see the line. The bait may be properly colored to represent the natural live shiner.

Figure 1:
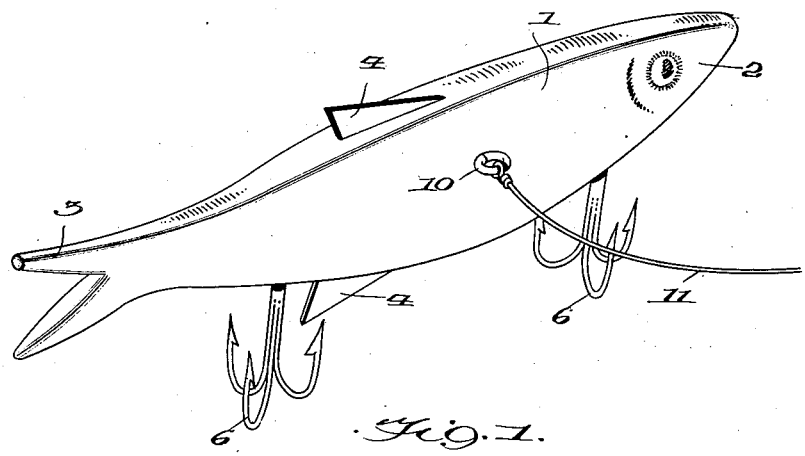
Fig. 1 is a perspective view of the invention.
Figure 2:
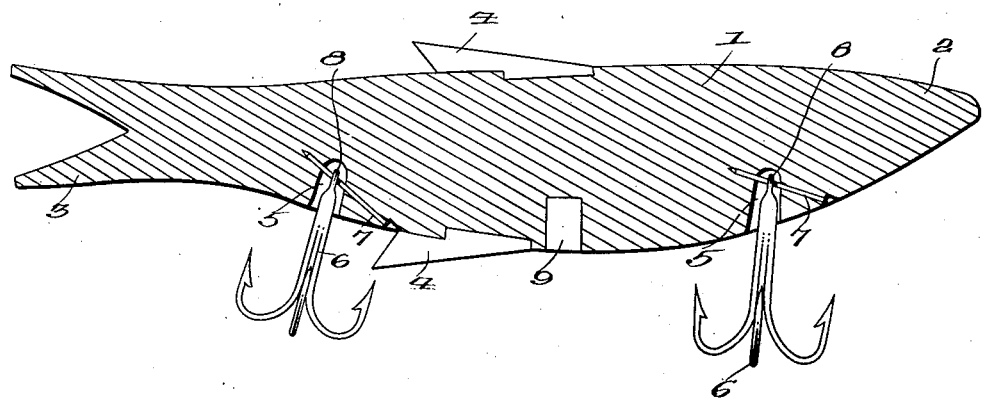
Fig. 2 is a longitudinal sectional view therethrough.

The numeral 1 indicates the body of the bait, which may be constructed of any suitable material, as for instance of wood preferably, although metal might be used if desired. The body may be provided with the head and tail portions 2 and 3 and fins 4 to represent the natural live Florida shiner, being suitably painted and colored for this purpose.

Recesses 5 are formed preferably in the bottom of the body portion 1 for the reception of the hooks 6 which extend thereinto and are held in place by nails or other suitable fastening devices 7 being driven through the eyes 8 of the hooks and extending across the openings 5 to hold the hooks in proper suspended relation to the bait. A weight 9 may be fastened in the bottom of the bait to maintain the latter in its proper position and to properly balance the bait.

A screw eye 10 is inserted into the side of the body portion 1 to which may be attached the line 11, the purpose of fastening the eye 10 for the line in the side of the bait being to keep the bait away from the side of the boat during retrieving of the line and to conceal the line from the view of the fish, which is usually on the opposite side of the bait from the boat.

In casting, the bait is usually cast toward the shore where it travels in the arc of a circle, according to the length of the line. The fish are usually on the opposite side of the bait from the line and the connection of the line with a side of the bait conceals the former from the fish, which facilitates catching them.

The bait may be properly colored and fashioned to represent the live shiner, which has great advantages in trapping the fish. It is usually desirable to use it as a surface bait, although added weight may be applied for an under water bait.

The bait is extremely simple in construction and is extremely successful in trapping the fish.

I claim:—

1. A fish bait having an opening in the underside thereof, a hook having an eye disposed in said opening, and a member driven from the outside transversely across the opening and through the eye of the hook, and having both end portions thereof embedded in the material of the bait on opposite sides of the opening.

2. A fish bait simulating a minnow and having means at a side thereof for attachment of a line, said means being disposed intermediate the ends of the bait and intermediate the top and bottom edges thereof and permitting the line to extend laterally from the bait approximately at right angles to the axis of the bait while holding the bait in an upright position, to cause the bait to glide in an arc of a circle.

3. A fish bait comprising a body portion having an attachment at a side thereof intermediate the ends for connection with a line, and disposed relative to the body portion to cause the bait to float in an arc of a circle.

4. A fish bait simulating a minnow, and having an eye secured at a side thereof intermediate the ends for connection with a line, and so disposed relative to the bait to cause the bait to glide in an arc of a circle about the opposite end of the line, a weight for holding the bait in an upright position, and a hook carried by the bait.

In testimony whereof I affix my signature.

FRED L. B. FLOOD.